J. W. HAMILTON.
PULLEY.
APPLICATION FILED JULY 24, 1909.

990,648.

Patented Apr. 25, 1911.

Witnesses
William C. Linton.
J. F. Byrne.

Inventor
John W. Hamilton,
By Victor J. Evans
Attorney

THE NORRIS PETERS CO., WASHINGTON, D. C.

UNITED STATES PATENT OFFICE.

JOHN WILLIAM HAMILTON, OF GALENA, KANSAS.

PULLEY.

990,648. Specification of Letters Patent. Patented Apr. 25, 1911.

Application filed July 24, 1909. Serial No. 509,307.

*To all whom it may concern:*

Be it known that I, JOHN WILLIAM HAMILTON, a citizen of the United States, residing at Galena, in the county of Cherokee and State of Kansas, have invented new and useful Improvements in Pulleys, of which the following is a specification.

My invention relates to improvements in pulleys, and it is particularly directed to improvements in the pulleys of elevators of that type which comprises shafts, pulleys mounted on the shafts, a belt mounted on the pulleys, and buckets secured to the belt.

The primary object of the invention is the provision of a pulley that shall have its periphery provided with a plurality of relatively spaced ribs, which when the pulley is in use will increase the adhesiveness between the pulley and the belt to such an extent as to prevent the belt from slipping off of and around the pulley. The spaces between the ribs and the pulley provide pockets for the reception of water, gravel, or any other material that may fall from the belt on to the pulley or that may adhere to the inner surface of the belt, whereby to prevent such material from grinding, cutting, or otherwise injuring the belt, such pockets also preventing the formation of an air cushion between the belt and the periphery of the pulley.

A further object of the invention is the provision of a pulley which shall be simple, durable and efficient, and which may be manufactured and sold at a comparatively low cost.

With the above and other objects in view, the invention consists in the novel construction, combination and arrangement of parts hereinafter fully described and claimed, and illustrated in the accompanying drawing, wherein:—

Figure 1:
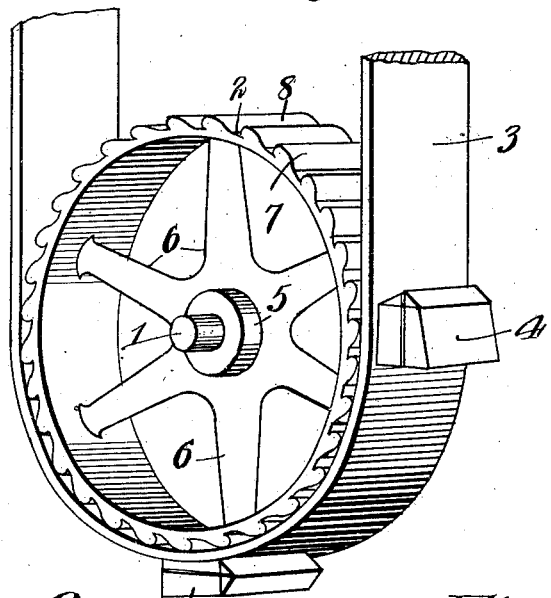
Figure 2:
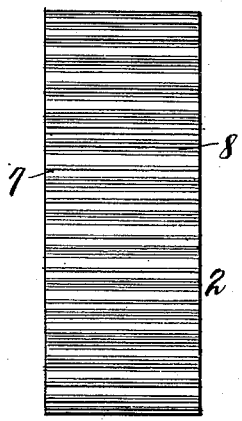
Figure 3:
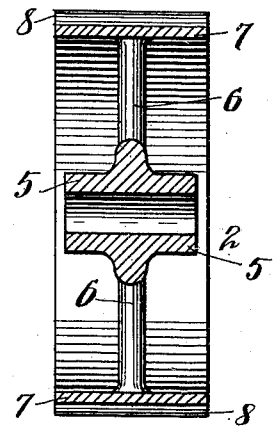

Figure 1 is a perspective view of a fragmentary portion of an elevator, illustrating the application of my improved pulley. Fig. 2 is a view in end elevation of the pulley, and Fig. 3 is a sectional view taken on a plane extending centrally and transversely through the pulley.

Referring to the drawing by reference numerals, 1 designates the shaft, 2 the pulley, 3 the belt, and 4 the buckets of an elevator, all except the pulley being of the usual forms and constructions.

The pulley comprises a hub 5, spokes 6, and a rim 7. The rim 7 is formed to provide at its periphery a plurality of ribs 8, which are relatively spaced throughout their entire lengths, and which in the preferred embodiment of the invention extend transversely of the rim or otherwise if desired. The ribs 8 engage the belt 3 with such friction as to prevent the belt from slipping off of and around the pulley. The spaces between the ribs 8 form pockets which receive water, gravel, or any other material that may fall from the belt 3 on to the pulley or that may adhere to the inner surface of the belt, whereby to prevent such material from grinding, cutting, or otherwise injuring the belt. The pockets also prevent the formation of an air cushion between the belt and the pulley. The ribs 8 are curved in a direction reverse to that in which the pulley rotates, and their outer edges are rounded off to prevent the abrasion or cutting of the belt.

It should be apparent from the above description, taken in connection with the accompanying drawing, that I provide a pulley which shall prevent the belt from slipping off of and around the same, which shall prevent the formation of an air cushion between its periphery and the belt, which shall prevent material on its periphery or on the inner surface of the belt from cutting, abrading, or otherwise injuring the belt, and which may be manufactured and sold at a comparatively low cost.

While I have described the method of operation of the invention, together with the apparatus which I now consider to be the best embodiment thereof, I desire to have it understood that the apparatus shown is merely illustrative and that such changes may be made when desired as are within the scope of the claim.

Having thus described the invention what is claimed as new is:—

In a pulley, a rim, and closely arranged outwardly projecting transverse ribs on the outer surface of said rim, the said ribs being inclined in the same direction relative to each other and in tangential planes with respect to the rim for forming pockets in the latter opening in a reverse direction to the travel of the pulley.

In testimony whereof I affix my signature in presence of two witnesses.

JOHN WILLIAM HAMILTON.

Witnesses:
W. A. STONE,
IRA C. PERKINS.

Copies of this patent may be obtained for five cents each, by addressing the "Commissioner of Patents, Washington, D. C."